US008860735B2

(12) United States Patent
Fields, Jr. et al.

(10) Patent No.: US 8,860,735 B2
(45) Date of Patent: *Oct. 14, 2014

(54) ALIGNING SCRIPT ANIMATIONS WITH DISPLAY REFRESH

(71) Applicant: Microsoft Corporation, Redmond, WA (US)

(72) Inventors: M. David Fields, Jr., Kirkland, WA (US); Cenk Ergan, Bellevue, WA (US); Qiang Chen, Sammamish, WA (US); Michael D. Decker, Bellevue, WA (US); Katerina V. Sedova, Seattle, WA (US); Karen Elizabeth Parker Anderson, Sammamish, WA (US); Jatinder Singh Mann, Redmond, WA (US); Walter V. von Koch, Seattle, WA (US); Jason J. Weber, Medina, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/653,275

(22) Filed: Oct. 16, 2012

(65) Prior Publication Data
US 2013/0063448 A1 Mar. 14, 2013

Related U.S. Application Data

(63) Continuation of application No. 13/229,618, filed on Sep. 9, 2011.

(51) Int. Cl.
G06T 13/00 (2011.01)
G06T 15/00 (2011.01)

(52) U.S. Cl.
CPC ............... G06T 13/00 (2013.01); G06T 15/005 (2013.01)
USPC ........................................................ 345/473

(58) Field of Classification Search
CPC ..... H04L 67/02; G06T 2213/04; G06T 13/00; G06T 2213/08; G06T 2213/12
See application file for complete search history.

(56) References Cited

U.S. PATENT DOCUMENTS

| 5,384,910 | A | 1/1995 | Torres |
| 6,073,148 | A | 6/2000 | Rowe et al. |
| 6,271,858 | B1 | 8/2001 | Dalal et al. |
| 6,631,498 | B1 | 10/2003 | McCauley et al. |
| 6,693,964 | B1 | 2/2004 | Zhang et al. |
| 7,034,834 | B2 | 4/2006 | Blanco et al. |
| 7,099,926 | B1 | 8/2006 | Ims et al. |
| 7,265,758 | B2 * | 9/2007 | Blanco et al. .................. 345/473 |

(Continued)

OTHER PUBLICATIONS

Robinson, James and McCormack, Cameron. "Timing Control for Script-based Animations". W3C Working Draft. Jun. 2, 2011.*

(Continued)

Primary Examiner — Kee M Tung
Assistant Examiner — Nicholas R Wilson
(74) Attorney, Agent, or Firm — Andrew Sanders; Micky Minhas

(57) ABSTRACT

Various embodiments align callbacks to a scripting component that enable the scripting component to update animation, with a system's refresh notifications. Specifically, an application program interface (API) is provided and implemented in a manner that generates and issues a callback to the scripting component when the system receives a refresh notification. This provides the scripting component with a desirable amount of time to run before the next refresh notification.

11 Claims, 6 Drawing Sheets

(56) References Cited

U.S. PATENT DOCUMENTS

| | | |
|---|---|---|
| 7,443,401 B2 | 10/2008 | Blanco et al. |
| 7,450,130 B2 | 11/2008 | Swedberg et al. |
| 7,487,201 B1 | 2/2009 | Murray et al. |
| 7,548,237 B2 | 6/2009 | David et al. |
| 7,554,544 B2 | 6/2009 | MacLaurin |
| 2004/0201618 A1 | 10/2004 | Alderson |
| 2008/0120368 A1 | 5/2008 | Gale et al. |
| 2008/0303828 A1 | 12/2008 | Marchant et al. |
| 2009/0189912 A1 | 7/2009 | Holtman |
| 2011/0083070 A1 | 4/2011 | Maryka et al. |
| 2013/0063444 A1 | 3/2013 | Fields, Jr. |
| 2013/0067314 A1 | 3/2013 | Rogers |
| 2013/0067320 A1 | 3/2013 | Rogers |

OTHER PUBLICATIONS

Robinson, James et al., "Timing Control for Script-based Animations", *W3C*, retrieved from <http://www.w3.org/TR/animation-timing/> on Aug. 25, 2011, (Jun. 2, 2011), 8 pages.

Rouget, Paul "More efficient Javascript Animations with mozRequestAnimationFrame", retrieved from <http://hacks.mozilla.org/2010/08/more-efficient-javascript-animations-with-mozrequestanimationframe/> on Aug. 24, 2011, (Aug. 16, 2010), 7 pages.

Vonkoch, Walter "Measuring Browser Performance with the Windows Performance Tools", *MSDN Blogs*, retrieved from <http://blogs.msdn.com/b/ie/archive/2010/06/21/measuring-browser-performance-with-the-windows-performance-tools.aspx> on Aug. 30, 2011,(Jun. 21, 2010), 14 pages.

Weber, Jason "A Closer Look at Internet Explorer 9 Hardware Acceleration Through Flying Images", *MSDN Blogs*, retrieved from <http://blogs.msdn.com/b/ie/archive/2010/-4/07/a-closer-look-at-internet-explorer-9-hardware-acceleration-through-flying-images.aspx> on Aug. 30, 2011,(Apr. 7, 2010), 34 pages.

"How Browsers Work", retrieved from <http://taligarsiel.com/Projects/howbrowserswork1.htm> on Aug. 23, 2011, 31 pages.

"Non-Final Office Action", U.S. Appl. No. 13/229,696, (Feb. 6, 2013), 18 pages.

"Non-Final Office Action", U.S. Appl. No. 13/655,379, (Jan. 31, 2013), 18 pages.

Al Zabir, Omar "Fast ASP.NET Web Page Loading by Downloading Multiple Javascripts after Visible Content and in Batch", *The Code Project*, retrieved from <http://www.codeproject.com/KB/aspnet/fastload.aspx> on Aug. 23, 2011,(Aug. 3, 2008), 13 pages.

"Non-Final Office Action", U.S. Appl. No. 13/229,618, (Jan. 15, 2013), 15 pages.

"Final Office Action", U.S. Appl. No. 13/229,618, (Jun. 3, 2013), 29 pages.

"Final Office Action", U.S. Appl. No. 13/229,696, (Jul. 17, 2013), 23 pages.

"Final Office Action", U.S. Appl. No. 13/655,379, (Jul. 18, 2013), 23 pages.

"Notice of Allowance", U.S. Appl. No. 13/229,618, Jul. 2, 2014, 14 pages.

"Non-Final Office Action", U.S. Appl. No. 13/229,696, Apr. 10, 2014, 23 pages.

"Non-Final Office Action", U.S. Appl. No. 13/655,379, Apr. 10, 2014, 23 pages.

\* cited by examiner

ALIGNING SCRIPT ANIMATIONS WITH DISPLAY REFRESH

RELATED APPLICATION

This application is a continuation of and claims priority under 35 U.S.C. §120 to U.S. patent application Ser. No. 13/229,618, filed on Sep. 9, 2011, the disclosure of which is incorporated by reference herein in its entirety.

BACKGROUND

Animations in web browsers typically come in two forms: native, declarative ones, such as the <animate> element in Scalable Vector Graphics (SVG), and those that are implemented imperatively in script, such as Javascript. These script-based animations are most often performed by scheduling a callback to perform custom script based animations. Typically, callbacks are registered using either a setTimeout( ) method that specifies a particular time value, in milliseconds, when a callback is desired, or a setInterval( ) method that specifies an interval over which callbacks are desired to be received. The callbacks are used by a Javascript engine to execute animation code to update an object model so that a new display can be rendered by a rendering engine.

There are several challenges with this approach including over-notification and unnecessarily high power consumption. Specifically, if callbacks occur too rapidly, some of the work that is done by the script engine will not be rendered because it will have been replaced with more subsequent work. This leads to power inefficiencies stemming from unnecessary work and choppy animations. Specifically, a disadvantage of this approach is that the author of the animation script has no idea what the ideal frequency for updating their animation is. Instead, the easiest way for the author is to simply call setTimeout( ) with a very small value, which in practice, will be clamped by the system to some minimum time such as 10 ms. It is not likely that 100 updates per second are needed for the animation, especially if the page is in a background tab or the browser window is minimized.

SUMMARY

This Summary is provided to introduce a selection of concepts in a simplified form that are further described below in the Detailed Description. This Summary is not intended to identify key features or essential features of the claimed subject matter.

Various embodiments align callbacks to a scripting component that enable the scripting component to update animation, with a system's refresh notifications. Specifically, an application program interface (API) is provided and implemented in a manner that generates and issues a callback to the scripting component when the system receives a refresh notification. This provides the scripting component with a desirable amount of time to run before the next refresh notification. Efficiencies are gained by allowing an application, such as a web browser and others, to determine when the scripting component receives its callback, rather than relying on specified callback time values or intervals. This can reduce power consumption by avoiding unnecessary work and can reduce visual choppiness in an animation.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Various embodiments align callbacks to a scripting component that enable the scripting component to update animation, with a system's refresh notifications. Specifically, an application program interface (API) is provided and implemented in a manner that generates and issues a callback to the scripting component when the system receives a refresh notification. This provides the scripting component with a desirable amount of time to run before the next refresh notification. Efficiencies are gained by allowing an application, such as a web browser and others, to determine when the scripting component receives its callback, rather than relying on specified callback time values or intervals. This can reduce power consumption by avoiding unnecessary work and can reduce visual choppiness in an animation.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Environment

Figure 1:
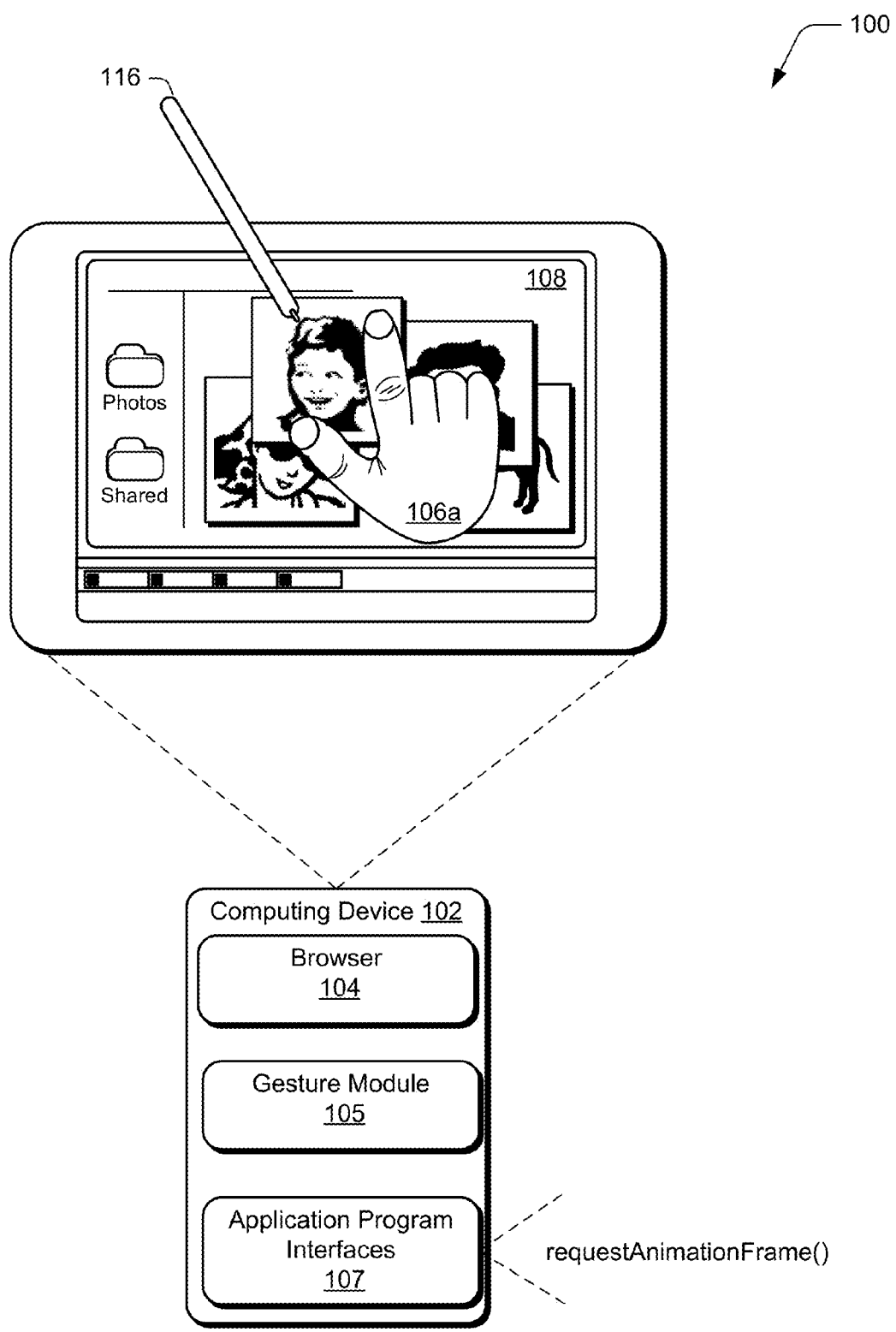
FIG. 1 is an illustration of an environment in an example implementation in accordance with one or more embodiments.

FIG. 1 is an illustration of an environment 100 in an example implementation that is operable to employ power efficient callback patterns described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes a web browser 104 to provide functionality as described in this document. Although a web browser is utilized as an example application that can utilize the embodiments described herein, applications other than web browsers can be employed without departing from the spirit and scope of the claimed subject matter. The web browser can be implemented in connection with any suitable type of hardware, software, firmware or combination thereof. In at least some embodiments, the web browser is implemented in software that resides on some type of tangible, computer-readable storage medium examples of which are provided below.

Web browser 104 is representative of functionality that enables the user to browse to different web of sites and consume content associated with those websites.

Computing device 102 can also include a gesture module 105 that recognizes gestures that can be performed by one or more fingers, and causes operations to be performed that correspond to the gestures. The gestures may be recognized by module 105 in a variety of different ways. For example, the gesture module 105 may be configured to recognize a touch input, such as a finger of a user's hand 106a as proximal to display device 108 of the computing device 102 using touchscreen functionality. Module 105 can be utilized to recognize single-finger gestures and bezel gestures, multiple-finger/same-hand gestures and bezel gestures, and/or multiple-finger/different-hand gestures and bezel gestures.

The computing device 102 may also be configured to detect and differentiate between a touch input (e.g., provided by one or more fingers of the user's hand 106a) and a stylus input (e.g., provided by a stylus 116). The differentiation may be performed in a variety of ways, such as by detecting an amount of the display device 108 that is contacted by the finger of the user's hand 106 versus an amount of the display device 108 that is contacted by the stylus 116.

Thus, the gesture module 105 may support a variety of different gesture techniques through recognition and leverage of a division between stylus and touch inputs, as well as different types of touch inputs.

In addition, the computing device 102 includes a plurality of Application Program Interfaces (APIs) 107 that can be used to register for callbacks as will be described below. In this particular example, the APIs include a requestAnimationFrame( ) method.

The requestAnimationFrame( )method can be used to align callbacks to a scripting component that enable the scripting component to update animation, with a system's refresh notifications. Specifically, the requestAnimationFrame( ) method is implemented in a manner that allows a callback to be specified and issued to the scripting component when the system receives a refresh notification. This provides the scripting component with a desirable amount of time to run before the next refresh notification.

Figure 2:
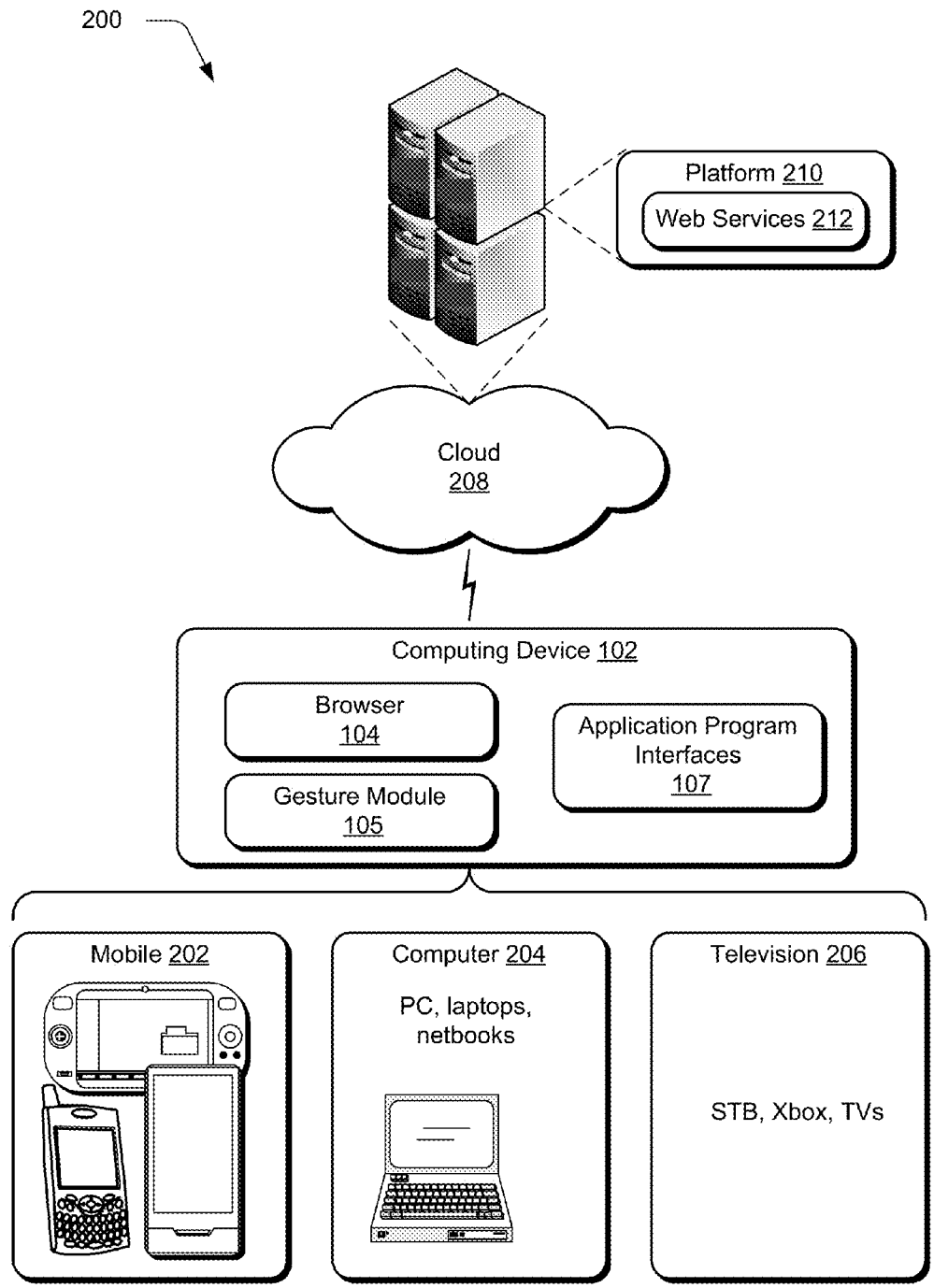
FIG. 2 is an illustration of a system in an example implementation showing FIG. 1 in greater detail.

FIG. 2 illustrates an example system 200 showing the browser 104, gesture module 105, and APIs 107 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

The gesture techniques supported by the gesture module may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe example embodiments. A section entitled "Aligning Script Callbacks with Refresh Notifications" describes how script callbacks can be aligned with refresh notifications in accordance with one or more embodiments. Next, a section entitled "Example requestAnimationFrame Interface" describes an example interface in accordance with one or more embodiments. Following this, a section entitled "Example Activity Diagram" describes an example activity diagram in accordance with one or more embodiments. Next, a Section Entitled "Example Method" describes an example method in accordance with one or more embodiments. Last, a section entitled "Example Device" describes aspects of an example device that can be utilized to implement one or more embodiments.

Having described example operating environments in which the inventive techniques can be utilized, consider now a discussion of one or more embodiments in which script callbacks can be aligned with refresh notifications in accordance with one or more embodiments.

Aligning Script Callbacks with Refresh Notifications

As noted above, using the requestAnimationFrame( ) API, web developers can schedule animations to reduce power consumption and choppiness. For example, animations today generally occur even when a web site is in a background tab, minimized, or otherwise not visible, thus wasting precious battery life. Animations today are not generally aligned with the display's refresh rate, causing choppiness in the animation. As an example, consider the following in connection with FIG. 3.

Figure 3:
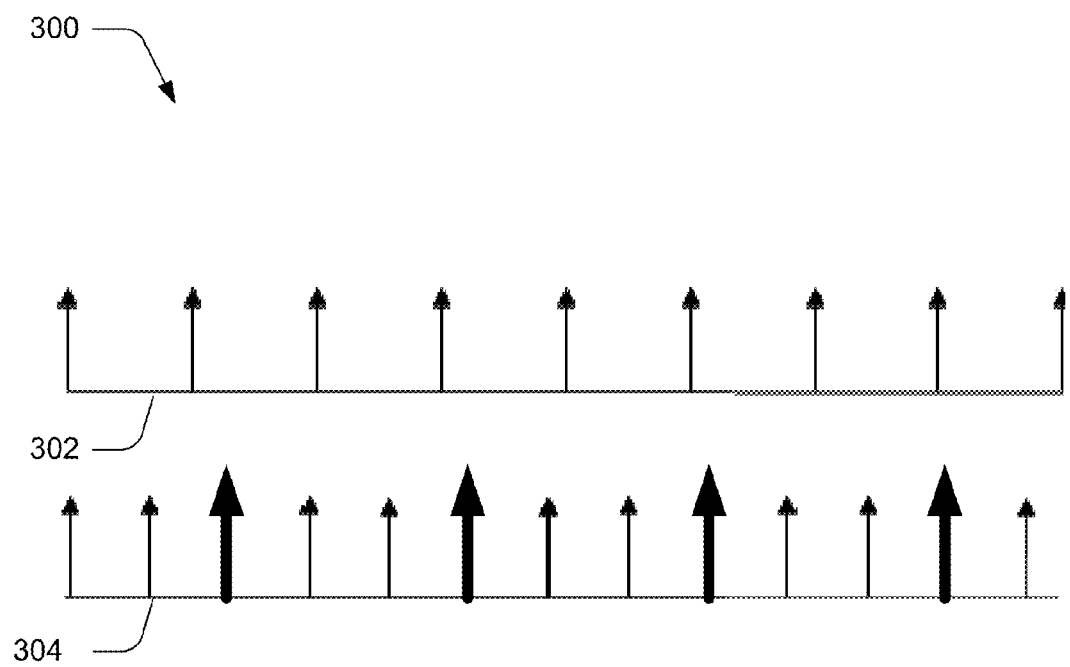
FIG. 3 is a diagram that illustrates one aspect of callbacks that can occur relative to a system's refresh rate.

Most animations use a JavaScript timer resolution of less than 16.7 ms to draw animations, even though most monitors can only display at 16.7 ms periods (at 60 Hz frequency). FIG. 3 illustrates two graphs, generally at 300, which illustrate aspects of this situation.

Specifically, graph 302 represents the 16.7 ms display monitor frequency. Graph 304 represents a typical setTimeout or setInterval of 10 ms. In this case, the end user will never see every third draw (illustrated by the overly-bold arrows in graph 304) because another draw will occur before the display refreshes. This overdrawing results in choppy animations as every third frame is lost. Reducing the timer resolution can also negatively impact battery life, as will be appreciated by the skilled artisan.

Further, without knowledge of page visibility, animations are drawn even when the user cannot view them, as when a page is minimized or in a background tab. This leads to further inefficiencies and reduced battery life.

Example requestAnimationFrame Interface

As but one example implementation of a requestAnimationFrame interface, consider the following:
long requestAnimationFrame(in FrameRequestCallback callback)
void cancelRequestAnimationFrame (in long handle)

The requestAnimationFrame( ) method calls the callback function in connection with a display refresh, when the page is visible. This effectively aligns callbacks to a scripting component that enable the scripting component to update animation, with a system's refresh notifications. This provides the scripting component with a desirable amount of time to run before the next refresh notification. Efficiencies are gained by allowing a web browser (or, in other embodiments, other applications) to determine when the scripting component receives its callback, rather than relying on specified callback time values or intervals. This can reduce power consumption by avoiding unnecessary work, e.g. layout work that would otherwise not be seen as described above, and can reduce visual choppiness in an animation.

In one or more embodiments, when the page is not visible, as determined by checking if the page is not at least partially visible on at least one screen, this function does not call the callback. For example, if the page is on a background tab, the associated window is minimized or other applications are in the forefront covering the associated window entirely, this API will not return the callback. In one or more embodiments, if the associated window containing the page is minimized but a thumbnail preview is shown, this API will return the callback.

In the illustrated and described embodiment, requestAnimationFrame schedules a single callback, like setTimeout( ). If a subsequent animation frame is desired, then requestAnimationFrame is called again from within the callback.

The cancelRequestAnimationFrame( ) function takes the handle to the requestAnimationFrame timer and allows a web developer to cancel the scheduled update. This function is similar in nature to the clearTimeout( ) function.

One example of using the requestAnimationFrame API, as compared with the setTimeout API is as follows:

---
setTimeout( )
---
```
var PERIOD = 1;
function init( ) {
    setTimeout(draw, PERIOD);
}
function draw( ) {
    //Draw to the screen
    setTimeout(draw, PERIOD);
}
```
---

---
requestFrameAnimation
---
```
function init( ) {
    window.requestAnimationFrame(draw);
}
function draw( ) {
    //Draw to the screen
    window.requestAnimationFrame(draw);
}
```
---

Notice in the setTimeout( ) API, a function and a time period are specified. In the requestAnimationFrame( ) API, however, no such period is specified. This is because the associated callback is aligned with the display refresh so the browser effectively decides when to make the callback to the scripting component.

Having considered an example API, consider now an example, simplified activity diagram that illustrates aspects of one embodiment.

Example Activity Diagram

Figure 4:
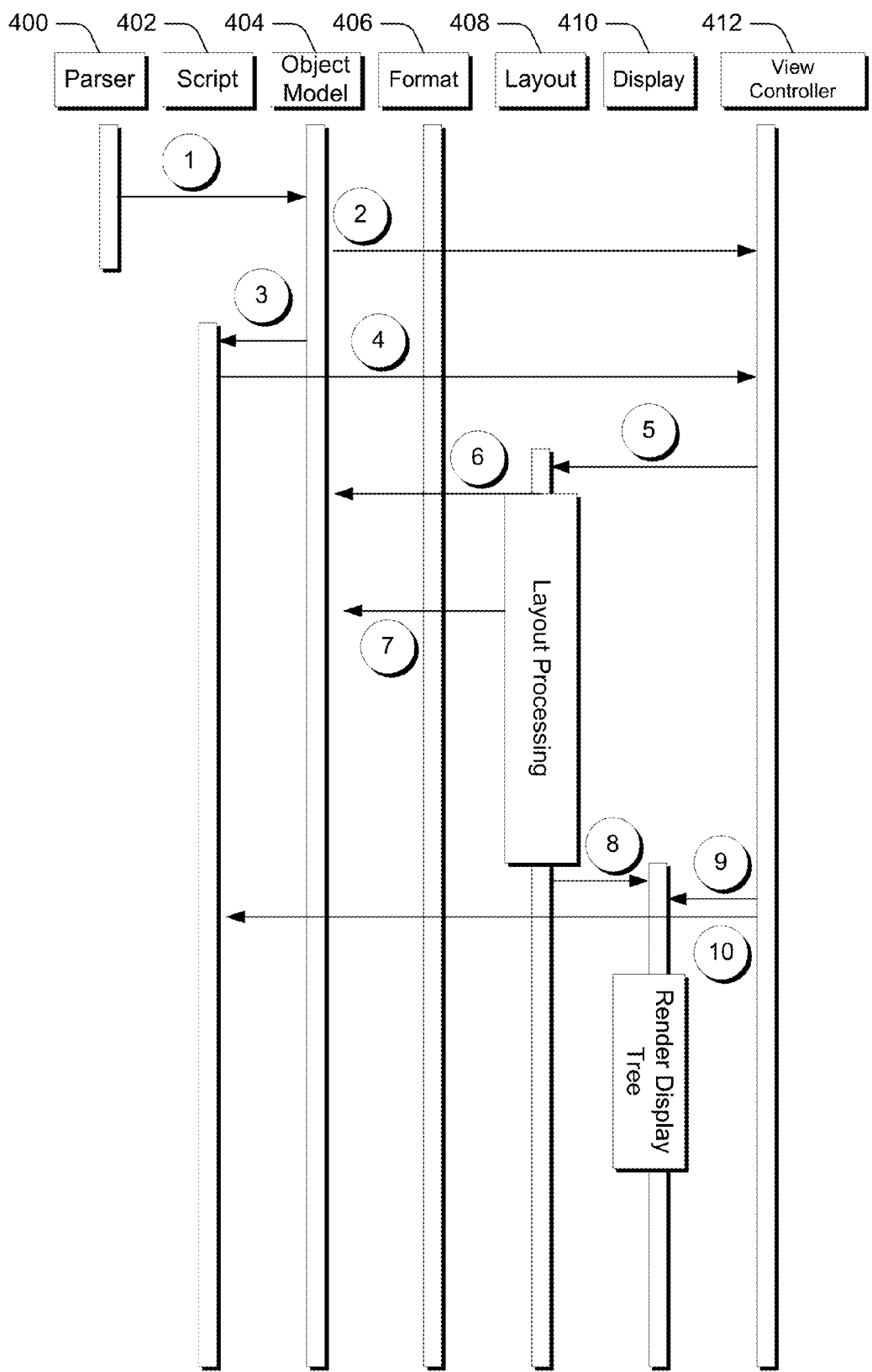
FIG. 4 is an activity diagram in accordance with one or more embodiments.

FIG. 4 illustrates a simplified example activity diagram that includes multiple different components in a layout pipeline in accordance with one or more embodiments. In this particular example, components within the layout pipeline include a parser 400, a script component 402, an object model 404, a format component 406, a layout component 408, a display component 410, and a view controller component 412. The layout pipeline can comprise part of a web browser. Alternately or additionally, the layout pipeline can comprise a standalone system or can comprise part of an application other than a web browser. Calls that are made between the various components are represented, generally, by encircled numbers. The calls, in this embodiment, occur in the order in which they appear numerically. However, such need not necessarily be the case, particularly with respect to the callback described below. For the sake of brevity, some of the calls and callbacks that are made between the various illustrative components are omitted.

In the illustrated and described embodiment, parser 400 is configured to receive and parse HTML content associated with a webpage. The parser processes the HTML which includes a number of HTML elements and, from the HTML elements builds a Document Object Model (DOM), herein referred to as simply an "object model."

Script component 402 is configured to interpret scripting source code and execute the script accordingly. In the illustrated and described embodiment, script component 402 comprises a JavaScript component.

Object model 404, in the illustrated and described embodiment, is a platform- and language-neutral interface that allows programs and scripts to dynamically access and update content, structure, and the style of associated documents, such as web pages. The documents can be further processed and the results of that processing can be incorporated back into a presented page.

Format component 406 is configured as a format cache to hold specified values which have a visual impact in preparation for the layout operations. For example, the format component 406 can hold HTML and CSS values that affect visual aspects of the layout operations.

Layout component 408 is configured to iterate over all the nodes of the object model and create a display tree. Creation of the display tree takes place through what is referred to in this document as "layout processing." Layout processing can be resource intensive. Layout processing includes processing information from the object model, such as HTML, XML, image files and the like, as well as formatting information such as CSS, XSL, and the like, and ascertaining where and how these elements are to be rendered on a computing device's display.

Display component 410 is configured to process the display tree and display or render the formatted content onto a computing device's display.

View controller component 412 is configured to cause the display component to refresh the screen by rendering the display tree. This is done, in part, by issuing a refresh notification or call to the layout component 408, as described below.

In operation, content including HTML and CSS content are received, in this particular example, by the web browser and parsed by parser 400. Through a series of calls from the parser 400 to the object model component 404, illustrated at "1", the object model is created. When the object model is created, the view controller 412 is notified, illustrated at "2", that the object model's content is to be used to render content at some point in the future.

When the parser completes its operations, an event is fired (not shown) to indicate that the status of the object model is complete. The object model 404 calls the script engine 402, illustrated at "3", to start the script engine. The script engine can then call requestAnimationFrame( ) at "4" to inform the view controller that it wishes to be notified in connection with a display refresh.

The view controller then calls the layout component 408, as illustrated at "5" to indicate that content is ready for rendering. At this point, layout processing can occur. When layout processing starts, the layout component 408 calls the object model, as illustrated at "6" so that the object model can recompute the various formatting information for the HTML and CSS for use in layout processing. The layout component 408 then calls the object model, as illustrated at "7" to retrieve the computed formatting information for use in its layout operations.

At this point, the layout component 408 iterates over all of the nodes of the object model and updates the layout, thus building a display tree. The layout component 408 then calls the display component 410, as illustrated at "8" to inform the display component that the display tree has been completed and is ready for rendering. Now, the system waits until the display component receives a call, as illustrated at "9", from the view controller 412 indicating that it is to render the display tree and refresh the display. The display component 410 can now render the display tree to screen. In connection with the display refresh issued at "9", a request animation event fires (not shown) and the view controller 412 can issue a callback at "11" to the script component 502 so that it can run associated animation script and update the object model accordingly. Updates to the object model will used in the next display refresh.

Example Method

Figure 5:
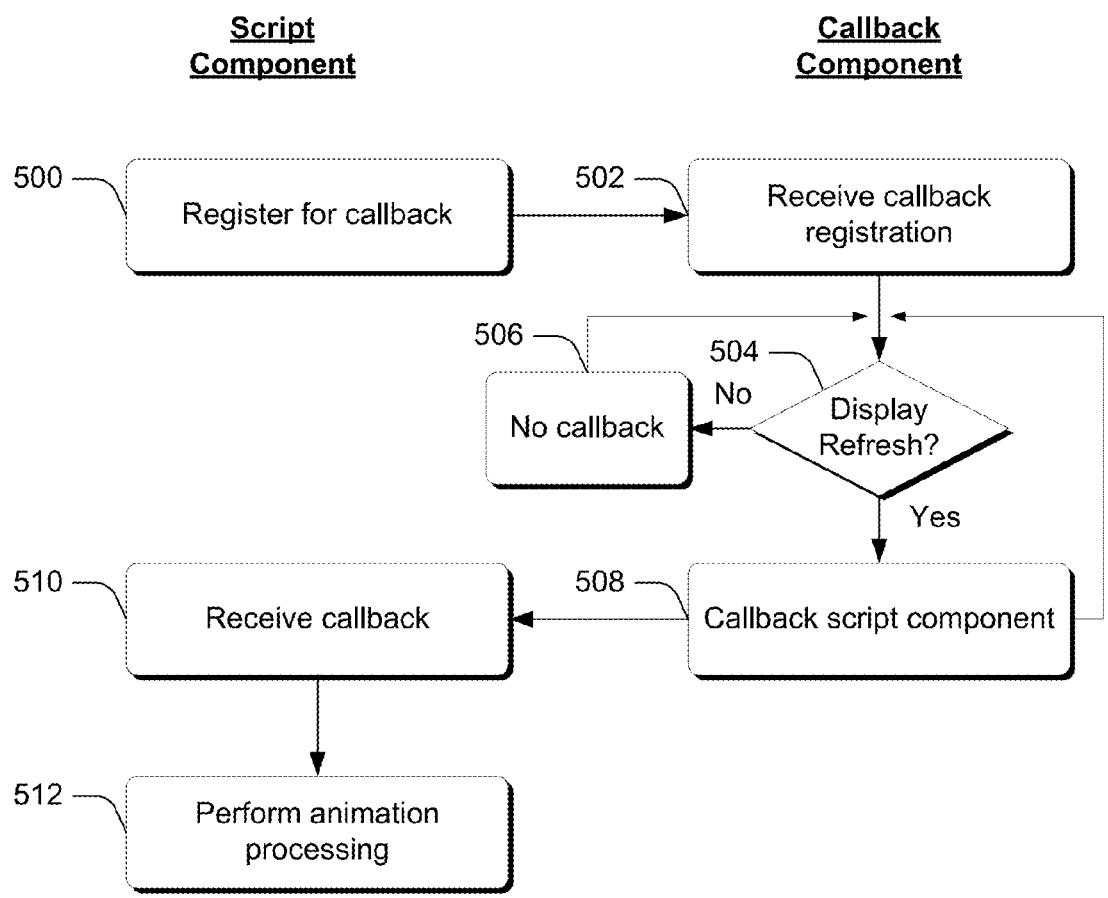
FIG. 5 is a flow diagram that describes steps in a method in accordance with one or more embodiments.

FIG. 5 is a flow diagram that describes steps in a method in accordance with one or more embodiments. The method can be implemented in connection with any suitable hardware, software, firmware, or combination thereof. In particular, the method can be implemented in connection with any system in which callbacks are typically utilized. Such systems can include, by way of example and not limitation, browser systems and/or environments in which JavaScript is employed. In this particular example, the method is divided into two columns, one labeled "Script Component" and the other labeled "Callback Component". The script component can comprise any suitable script component including, by way of example and not limitation, a JavaScript component. The callback component can comprise any suitable callback component that can be utilized to call the JavaScript component, as described in this document. In the FIG. 4 activity diagram, the callback component resided in the form of the view controller 412. Other components can provide callback functionality without departing from the spirit and scope of the claimed subject matter. For example, the callback notification may reside directly inside the script component, may be coordinated through the layout component, or may even exist in direct hardware management layers or hardware abstraction software layers.

Step 500 registers for a callback. This step can be performed in any suitable way. For example, this step can be performed by calling a suitably-configured API, such as the API described above, and providing a callback function which is to be called. In addition, this step can be performed independent of, and without providing an associated time period or interval at which a callback is to occur. Step 502 receives the callback registration. Step 504 ascertains whether there is to be or has been a display refresh. In association with a display refresh not being ascertained in step 504, step 506 does not callback the script component. In association with a display refresh being ascertained in step 504, step 508 calls back the script component. This step can be performed in any suitable way. For example, the callback issued by the callback component can be one that is associated with initiating or causing the script component to perform animation processing. Further, in at least some embodiment, prior to issuing the callback, the system may throttle the number of callbacks to improve power consumption and visual quality even further.

Step 510 receives the callback from the callback component and step 512 performs animation processing responsive to receiving the callback.

Having described various embodiments in which callbacks to a scripting component that enable the scripting component to update animation and be aligned with a system's refresh notifications, consider now an example device that can be utilized to implement one or more embodiments.

Example Device

Figure 6:
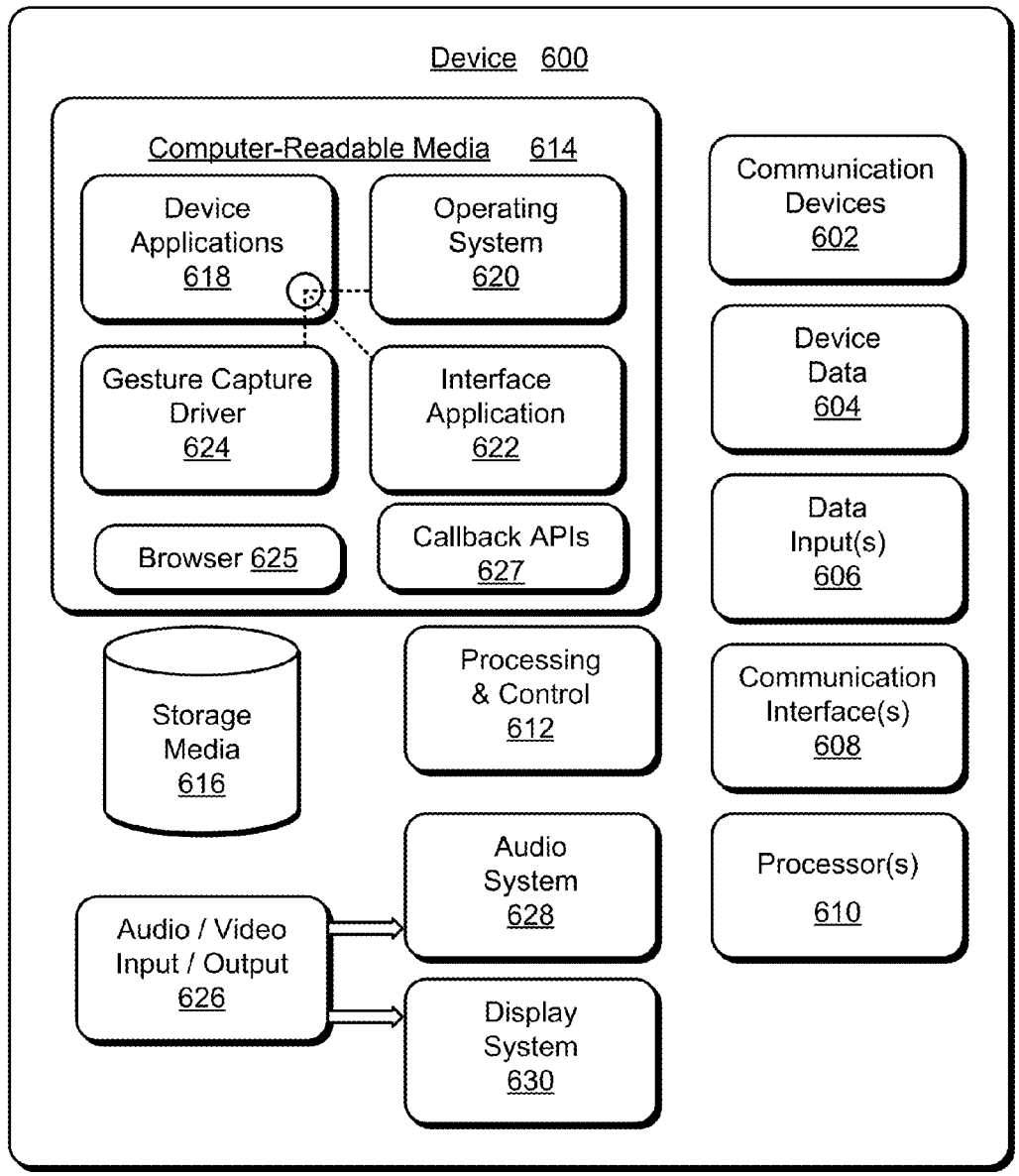
FIG. 6 illustrates an example computing device that can be utilized to implement various embodiments described herein.

FIG. 6 illustrates various components of an example device 600 that can be implemented as any type of portable and/or computer device as described with reference to FIGS. 1 and 2 to implement the embodiments described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable or readable instructions to control the operation of device 600 and to implement the embodiments described above. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 618 also include any system components or modules to implement embodiments of the techniques described herein. In this example, the device applications 618 include an interface application 622 and a gesture-capture driver 624 that are shown as software modules and/or computer applications. The gesture-capture driver 624 is representative of software that is used to provide an interface with a device configured to capture a gesture, such as a touchscreen, track pad, camera, and so on. Alternatively or in addition, the interface application 622 and the gesture-capture driver 624 can be implemented as hardware, software, firmware, or any combination thereof. In addition, computer readable media 614 can include a web browser 626 that functions as described above, as well as callback APIs 627 that function as described above.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Various embodiments align callbacks to a scripting component that enable the scripting component to update animation, with a system's refresh notifications. Specifically, an application program interface (API) is provided and implemented in a manner that generates and issues a callback to the scripting component when the system receives a refresh notification. This provides the scripting component with a desirable amount of time to run before the next refresh notification. Efficiencies are gained by allowing an application, such as a web browser and others, to determine when the scripting component receives its callback, rather than relying on specified callback time values or intervals. This can reduce power consumption by avoiding unnecessary work and can reduce visual choppiness in an animation.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
receiving, by a view controller in an application's layout pipeline, a callback registration, from a script component in the application's layout pipeline, the callback registration being associated with animation that is to occur within the application, the callback registration not specifying an associated time period or interval; and
when a display refresh is issued by the view controller, using the display refresh to initiate calling back the script component effective to cause the script component to perform animation processing, the display refresh being associated with animation that is to occur in the application, wherein the display refresh is an associated refresh of a physical display.

2. The method of claim 1 further comprising ascertaining whether a page associated with said animation processing is visible and, if not visible, not subsequently calling back the script component.

3. The method of claim 1 further comprising ascertaining if an associated window containing a page associated with animation processing has a visible thumbnail preview and, if so, subsequently calling back the script component.

4. The computer-implemented method of claim 1, wherein the application comprises a web browser.

5. One or more computer readable storage memories embodying computer readable instructions which, when executed, implement a method comprising:
   receiving, by a view controller in an application's layout pipeline, a callback registration, from a script component in the application's layout pipeline, the callback registration being associated with animation that is to occur within the application, the callback registration not specifying an associated time period or interval; and
   when a display refresh is issued by the view controller, using the display refresh to initiate calling back the script component effective to cause the script component to perform animation processing, the display refresh being associated with animation that is to occur in the application, wherein the display refresh is an associated refresh of a physical display.

6. The one or more computer readable storage memories of claim 5, further comprising ascertaining whether a page associated with said animation processing is visible and, if not visible, not subsequently calling back the script component.

7. The one or more computer readable storage memories of claim 5, further comprising ascertaining if an associated window containing a page associated with animation processing has a visible thumbnail preview and, if so, subsequently calling back the script component.

8. The one or more computer readable storage memories of claim 5, wherein the application comprises a web browser.

9. One or more computer-readable storage memories embodying an application configured to utilize a callback API to register for callbacks that are configured to align callbacks to a script component that enable the script component to update animation, with refresh notifications, alignment of the callbacks being performed by ascertaining that there has been a display refresh and, responsive to ascertaining that there has been a display refresh, issuing an associated callback, registration for said callbacks being performed without providing an associated time period or interval at which a callback is to occur, wherein the application is configured to utilize the callback API via a view controller within a layout pipeline of the application, wherein the display refresh is an associated refresh of a physical display.

10. The one or more computer-readable storage memories of claim 9, wherein the application is configured to not utilize the callback API in an event that a page associated with the animation is not visible.

11. The one or more computer readable storage memories of claim 9, wherein the application comprises a web browser.

* * * * *